July 4, 1950   J. SOLOMITO   2,514,352
MACHINE FOR MAKING COURSE HEIGHT STONE VENEER
Filed Dec. 23, 1946   4 Sheets-Sheet 1

INVENTOR.
JOSEPH SOLOMITO,
BY: Harold B. Hood.
ATTORNEY.

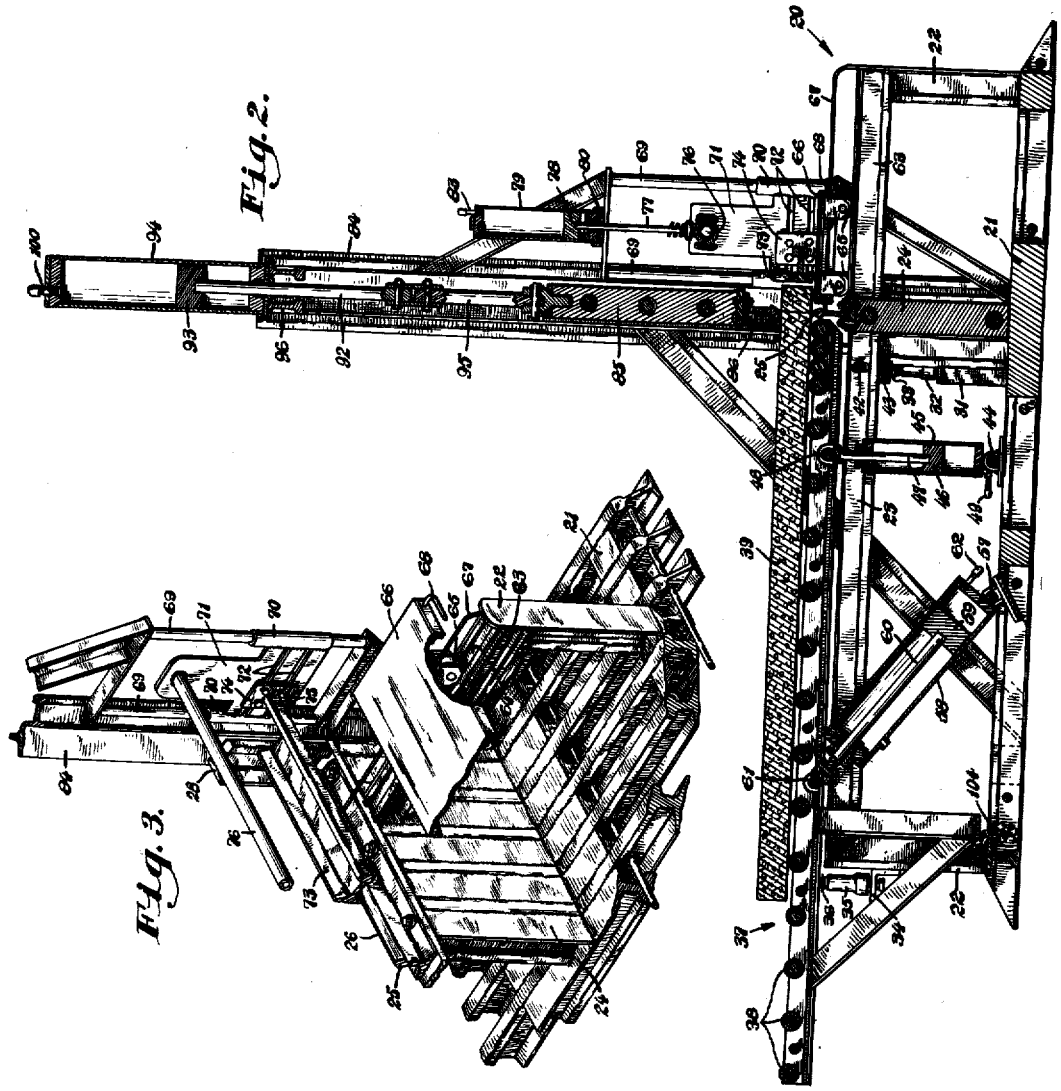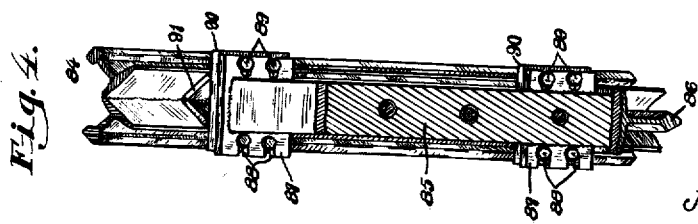
INVENTOR.
JOSEPH SOLOMITO,
BY: Harold B. Hood
ATTORNEY.

July 4, 1950 J. SOLOMITO 2,514,352
MACHINE FOR MAKING COURSE HEIGHT STONE VENEER
Filed Dec. 23, 1946 4 Sheets-Sheet 3
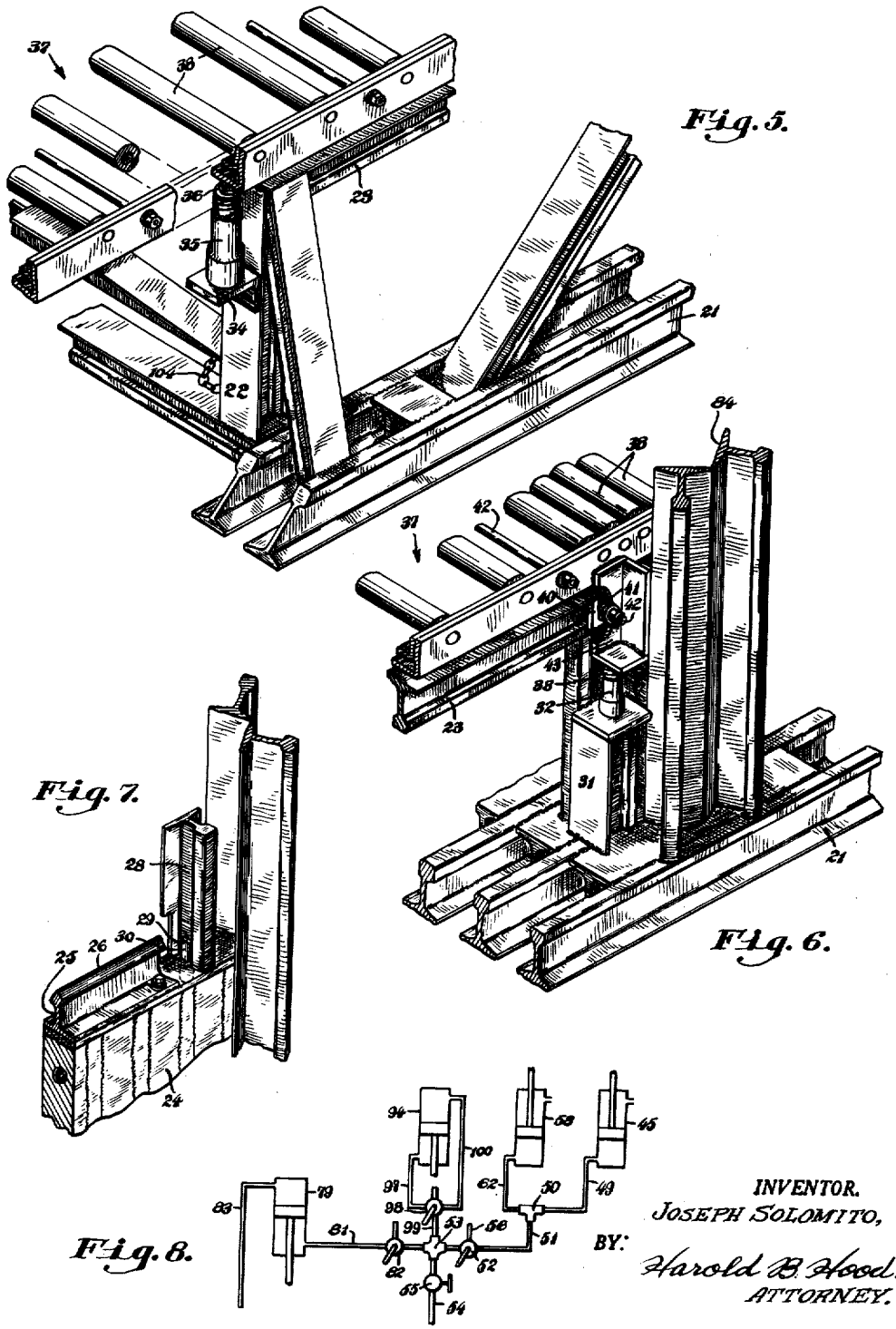
INVENTOR.
JOSEPH SOLOMITO,
BY: Harold B Hood.
ATTORNEY.

July 4, 1950 J. SOLOMITO 2,514,352
MACHINE FOR MAKING COURSE HEIGHT STONE VENEER
Filed Dec. 23, 1946 4 Sheets-Sheet 4

INVENTOR.
JOSEPH SOLOMITO,
BY: Harold B. Hood
ATTORNEY.

Patented July 4, 1950

2,514,352

UNITED STATES PATENT OFFICE 2,514,352

MACHINE FOR MAKING COURSE HEIGHT STONE VENEER

Joseph Solomito, Bloomington, Ind., assignor to Bloomington Limestone Corporation, Bloomington, Ind., a corporation of Indiana Application December 23, 1946, Serial No. 717,933

19 Claims. (Cl. 125—23)

The present invention relates to a machine and method for making course height stone veener. Broadly, the product is not new, having been produced heretofore by hand and, within the past few years, by machinery.

Pieces or slabs of natural or artificial stone, having sawed or natural top and bottom surfaces are broken transversely to produce blocks whose front and rear surfaces are fracture surfaces which, as is well known, are rough in appearance, developing the highest possible natural beauty of stone. The side edges of the slab, which become the end surfaces of the blocks, may be sawed or broken surfaces, as desired; and the top and bottom surfaces of the slab and blocks will normally be sawed surfaces, although on occasion, it may be desirable to use natural stratified slabs whose top and bottom surfaces will be substantially parallel.

Heretofore, it has been supposed that it is necessary, in machine breaking of slabs to produce the blocks with which the present invention is concerned, to use relatively sharp knives against the top and bottom surfaces of the slab, and to apply pressure, through those knives, gradually to the slab surfaces, whereby the knives actually crush tapered grooves into the top and bottom slab surfaces before starting an actual break of the slab. A machine for carrying out such a process is disclosed in the patent to Newsom 1,919,801 issued July 25, 1933; and the product of that machine is shown in the companion patent to Newsom 1,919,800 issued on the same date. As is clearly shown in the latter patent, the resultant fracture faces of the product are marred by the dubbed off corners 6 and 7 produced by the crushing action of the sharp knives.

I have found that, contrary to the disclosure of the above-identified patents, improved results can be obtained through breaking the stone by a sudden, sharp, extremely heavy impact delivered against the upper face of a slab by a dull, narrow, flat surface extending transversely across the slab, the blow being delivered in or adjacent to the plane normal to the top and bottom surfaces of the slab and in which is located a corresponding dull, narrow, flat surface in supporting engagement with the bottom surface of the slab, the region in which the blow is delivered being near an unsupported end portion of the slab projecting beyond said supporting narrow surface. I have found that substantially no crushing of the stone takes place when it is broken in accordance with the above procedure; and, through mechanism to be disclosed herein, blocks can be produced much more rapidly and efficiently than has been possible with machines heretofore known in the art.

I have also found that, if the above-described blow is delivered directly in the plane normal to the top and bottom slab surfaces and including the narrow supporting surface, the fracture will be substantially planar and normal to the top and bottom surfaces of the slab; whereas, if that blow is delivered in a plane normal to the slab top and bottom surfaces and nearer to the extremity of the slab than is the narrow supporting surface, the fracture surface will be bowed forwardly about an axis transverse to the slab and parallel with its top and bottom surfaces; and if the blow is delivered in a similar plane farther from the slab extremities than is the narrow supporting surface, the fracture surface will be oppositely bowed.

The primary object of the present invention, then, is to provide an improved means and method for breaking stone slabs to produce veneer blocks. A further object of the invention is to provide a method of producing, with a single set of jaws, different shapes of blocks. Further objects of the invention will become apparent as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 2 is a longitudinal section through such machine;

Fig. 3 is a fragmentary perspective, upon an enlarged scale, showing certain details of construction;

Fig. 4 is an enlarged fragmental perspective, looking down upon a fragment of the upper jaw block, and showing its slidable mounting and its adjustability;

Fig. 5 is a fragmental perspective showing the manner in which the rear end of the slab bed is supported;

Fig. 6 is a similar perspective showing the manner in which the front end of said bed is supported;

Fig. 7 is a fragmental perspective illustrating the mounting of the jaw stop blocks;

Fig. 8 is a diagrammatic illustration of the fluid motor control embodied in the machine;

Figure 9:
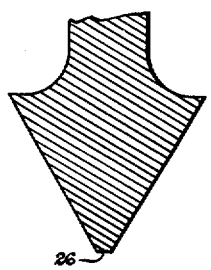
Fig. 9 is an enlarged transverse section through one form of jaw element.
Figure 10:
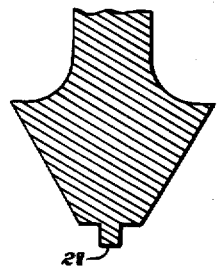
Fig. 10 is an enlarged transverse section through a modified form of jaw element.

Referring more particularly to the drawings, it will be seen that I have illustrated a frame, indicated generally by the reference numeral 20 and comprising a base 21, upright members 22, and longitudinal side frame members 23. Extending transversely of the frame, and near the delivery end thereof, is a solid table 24, rigidly associated with the base, and supporting, in a suitable manner, a lower jaw element 25. Said jaw element extends transversely of the frame and substantially from side to side thereof. The jaw element 25 may take almost any desired form, except that it must be of sufficient crushing strength to withstand the heavy weights and heavy blows to which it will be subjected in the operation of a machine of the character here under consideration, and must provide an upwardly-presented, dull, narrow flat face. Two suitable configurations are illustrated in Figs. 9 and 10, respectively. That face, which may be like the face 26 of Fig. 9 or the face 27 of Fig. 10, should be at least 1/16" wide, and I presently prefer to make it about 1/8" wide. Preferably, such face will be continuous from end to end of the jaw 25, but I believe that it may be desirable, in some instances, to interrupt it by notching the jaw 25 at spaced intervals. The advantages of such a flat, dull face over a knife blade, for work on stone, will be apparent. Not only does my jaw face substantially prevent crushing of the stone, but its very character is inherently economical, in that it does not require the frequent resharpening which is necessary when sharp blades are used against stone.

Figure 1:
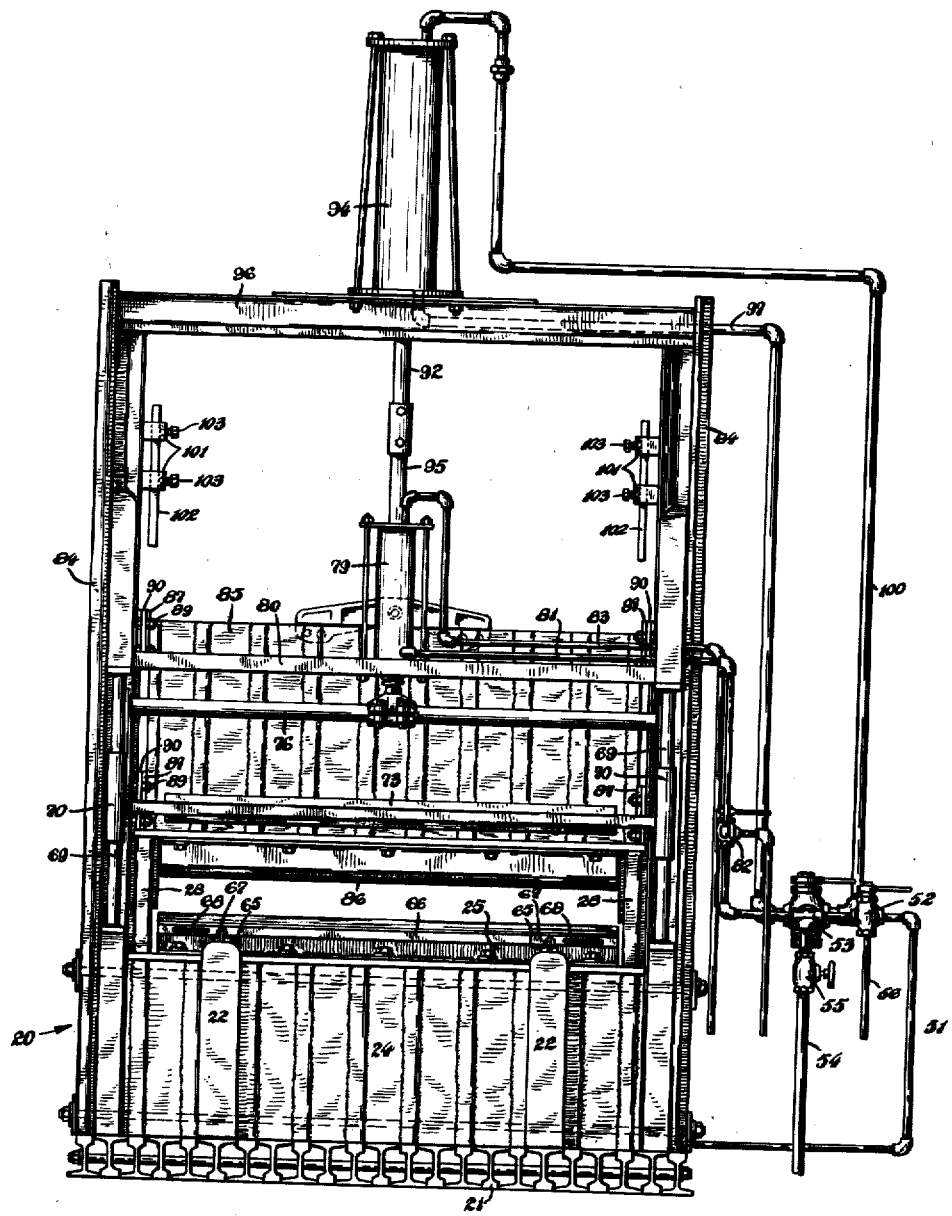
Fig. 1 is an end elevation of a machine constructed in accordance with the present invention, viewed from the delivery end of the machine.

At each end of the jaw 25 there is mounted a spacer block or stop 28 (Figs. 1 and 7). Each machine will be provided with a plurality of such blocks of different lengths; and it will be noted that each block is formed, at its lower end, with a socket 29 adapted to receive a pin 30 upstanding from the upper face of the table 24, whereby the block 28 may be firmly held in place. The vertical extent of the blocks selected will be such as to cooperate with the upper jaw to arrest the downward movement of such jaw at a time when the spacing between the upper and lower jaws is barely less than the vertical thickness of the slab to be broken, thus guarding against material crushing of the stone.

At points near the table 24, supports 31 (Figs. 2 and 6) are mounted upon the base 21 and carry upwardly opening cylinders 32 in which are reciprocably mounted spring pressed plungers 33. On the uprights 22 of the frame 20 at the intake end of the machine, I provide brackets 34 (Figs. 2 and 5) upon which are supported similar cylinders 35 reciprocably receiving spring pressed plungers 36. A stone supporting bed 37 normally rests upon the plungers 33 and 36, with one end of said bed close to the jaw 25, and the other end thereof remote from said jaw. Preferably, the bed 37 will carry a series of transverse rollers 38 upon which a stone slab 39 may be supported to move freely, longitudinally of the bed, under the influence of gravity, when the bed is tilted out of a horizontal plane. Under normal conditions, the bed will rest on the plungers 33 and 36 in a horizontal plane, said springs being sufficiently strong to support the weight of the bed and the weight of the slab, and to withstand the effect of heavy blows delivered against the upper surface of the slab.

At points close to the forward end of the bed, the frame members 23 have secured thereto bracket plates 40 (Fig. 6) each of which is formed with a vertical slot 41 therein. Reciprocably received in each of said slots is a bolt 42 passing through a snug opening in a bracket 43 fixed to the bed 37, and providing a journal mounting for the forward end of the bed upon the frame on which the bed may swing about an axis which is vertically movable.

Pivotally mounted at 44 (Fig. 2) upon the base 21 is a cylinder 45 in which is reciprocably received a piston 46 having a stem 47 pivotally connected at 48 to the bed 37. A conduit 49 leads from the base of the cylinder 45 to a fitting 50 (Fig. 8) from which a pipe 51 leads, through valve 52, to a fitting 53 to which, in turn, is connected a conduit 54 extending to a source of fluid under pressure (not shown), and controlled by a valve 55. The valve 52 includes an exhaust port 56 and is operable to connect the conduit 49 with the conduit 54 or with the exhaust 56, or to hold said conduit 49 closed.

Pivotally mounted at 57 (Fig. 2) upon the base 21 is a second cylinder 58 in which is reciprocable a piston 59 having a stem 60 pivotally connected at 61 to the bed 37, the point 61 being near the feed end of the bed, as shown. A conduit 62 leads from the base of the cylinder 58 to the fitting 50 (Fig. 8).

Two rails 63 (Fig. 3) extend longitudinally of the machine between the table 24 and the uprights 22, respectively, and their upper surfaces are grooved, as at 64, to provide guideways for the wheels 65 of a carriage 66. Preferably, guard rods 67, having their ends secured respectively to the uprights 22 and the table 24, immediately overlie the wheels 65; and the carriage is provided with hand grips 68 near its opposite ends (Figs. 1 and 3). As is clearly to be seen from an inspection of Figs. 2 and 3, the carriage 66 is movable on its trackway between a position immediately adjacent the jaw 25, but on the opposite side thereof from the bed 37, and a position at the extreme delivery end of the frame 20.

At each side of the machine, and on the delivery side of the jaw 25, I provide a pair of uprights 69, constituting a guideway for a pair of slide sleeves 70. Supported between said sleeves is a plate 71 formed with a pair of vertically spaced slots 72, extending in the direction of length of the machine. Supported between the plates 71 is a stop bar 73, said bar being provided, at each end, with a plate 74 carrying bolts 75 adapted to pass through the slots 72. Obviously, this arrangement provides for adjustment of the bar 73 in the direction of length of the machine; and said bar may be held in any desired position of adjustment by tightening down nuts (not shown) carried upon the bolts 75 on the outer sides of the plates 71. A bar 76 extends between the two plates 71, and the stem 77 of a piston 78 is operatively connected to said bar 76. The piston 78 is reciprocably mounted in cylinder 79, carried upon a suitable support 80, so that elevation of the piston 78 in the cylinder 79 will lift the bar 73. As is clearly to be seen from an inspection of Fig. 2, the bar 73 may be positioned directly in the path of the slab 39, at any desired distance from the jaw 25, within the range of the slots 72; but may be lifted out of the path of the slab by elevation of the piston 78. A conduit 81 (Figs. 1 and 8) leads from the base of said cylinder 79, through a valve 82 to the fitting 53. The valve 82 may be operated to open or close communication between the fitting 53 and the cylinder 79, or to open the lower end of the cylinder 79 to the atmosphere. The upper end of the cylinder 79 is connected with atmosphere by a conduit 83 which preferably leads to a point near the base of the machine, since oil and other foreign matter will inevitably be entrained in the air stream, and should be discharged near the ground.

In the region of the jaw 25, and at each side of the machine, I provide a vertical guideway 84 which preferably is V-shaped, as shown in Fig. 4. Reciprocably mounted in said guides is a heavy block 85 carrying, at its lower edge, a breaker jaw 86 like the jaw 25 and for cooperation therewith. At each lateral end, the block 85 carries a pair of plates 87 formed, as shown, with pairs of slots 88 through which extend bolts 89 taking into the plates 90 which, in turn, carry V-shaped shoes 91 engageable in the guideways 84. It will be clear from the illustrated construction, that the block 85 and its jaw member 86 may be adjusted in the direction of length of the machine.

The stem 92 of a piston 93, reciprocably mounted in a cylinder 94, is operatively connected to the block 85, and preferably will be connected thereto through the medium of a link 95. This construction provides flexibility in the connection between the piston 93 and the block 85, and further permits an increase or decrease in the effective length of the connection between the piston 93 and the block 85. The cylinder 94 is vertically arranged and is supported upon a transverse bar 96; and a conduit 97 leads from the base of said cylinder, through a valve 98 and conduit 99 to the fitting 53, while a second conduit 100 leads from the upper end of the cylinder 94 to said valve 98. The valve 98 is so constructed that it may alternatively connect the fitting 53 with either end of the cylinder 94, while simultaneously opening the opposite end of said cylinder to the atmosphere.

Suitably mounted on each guideway 84 is a pair of brackets 101 in each of which is adjustably positioned a stop rod 102, secured in place by screws 103, the function of said rods being to limit the upward movement of the block 85.

When it is desired to produce veneer blocks whose front and rear faces are substantially perpendicular to their top and bottom faces, the block 85 will be so adjusted that the jaw 86 and the jaw 25 lie in a common plane normal to the top and bottom surfaces of the slab 39. A slab is laid on the bed 37 by any suitable means, such as an overhead crane. Now, the position of the bar 73 upon its plates 71 is adjusted to establish the desired dimension of blocks to be broken, in the direction of length of the machine. With the stop bar 73 in the position of Fig. 2, the valve 98 is operated to admit fluid to the base of the cylinder 94, whereby the jaw 86 will be raised to a level determined by the setting of the bars 102. When the bed 37 is resting on the plungers 33 and 36, its upper surface will lie substantially in the horizontal plane of the dull flat face of the jaw 25. Since the bed surface is horizontal, there is no tendency for the slab 39 to move relative thereto.

Now, the valve 52 is operated to admit fluid to the bases of the cylinders 45 and 58. The forward end of the bed will be raised until the bolts 42 engage the upper ends of the slots 41, at which point upward movement of the forward end of the bed will be arrested. The rearward end of the bed, however, will continue to move upwardly under the influence of the piston 59 until a chain 104, extending between the base and a bracket on the bed, arrests its movement, the bed swinging about the axis of the bolts 42. Thus, the bed is tilted downwardly and to the right as viewed in Fig. 2 and, because the forward end of the bed has been lifted above the upper edge of the jaw 25, the slab may move freely downwardly over the surface of the bed, and under the influence of gravity, until it strikes the stop bar 73. Thus an end portion of the slab is projected beyond the bed and beyond the jaw 25. The valve 52 is now operated to exhaust the cylinders 45 and 58, whereupon the bed will return to the position of Fig. 2. Now, the narrow flat surface of the jaw 25 is in supporting engagement with that portion of the slab which projects beyond the bed 37, and a section of the slab, whose dimension has been determined by the setting of the bar 73, projects, unsupported, beyond the jaw 25. Obviously, since the bed pivots about the axis of the bolts 42, the returning movement of the bed will withdraw the extremity of the slab from its contact with the bar 73, and the parts (except for the block 85 and its associated elements) will be in the positions of Fig. 2.

Now, the valve 82 is operated to supply fluid under pressure to the base of the cylinder 79, thus elevating the stop bar 73 to remove it from the path of the slab.

Reversal of the position of the valve 98 will now exhaust the lower end of the cylinder 94 and supply fluid to the upper end of said cylinder, whereby the block 85 and its jaw 86 will be moved violently downwardly, under the influence not only of gravity but also of the pressure fluid supplied to the upper end of the cylinder 94, to cause the jaw 86 to deliver a heavy blow against the upper surface of the slab 93. Downward movement of the jaw 86 is arrested by the stops 28 immediately upon the delivery of the blow. In the adjustment of the parts above described, that section of the slab which is unsupported beyond the jaw 25 will be broken away, substantially upon the plane normal to the upper and lower surfaces of the slab 39 and common to the jaws 25 and 86; and such section will fall upon the carriage 66.

It will be noted that, at this time, the bed 37 is truly horizontal and the lower surface of the slab 39 is in the plane of the jaw 25, so that there is no tendency of the slab to move, and the jaw offers no resistance to movement of the slab. As the carriage 66 is moved toward the delivery end of the machine by a helper, the operator of the machine reinitiates the cycle above described by first operating the valve 98 to raise the block 85, then operating the valve 82 to lower stop bar 73, and then operating the valve 52 to elevate and tilt the bed 37 to feed the slab 39 forwardly in readiness for breaking of another block.

It will be seen that the machine is highly flexible and can be prepared for operation upon slabs of different thicknesses merely by replacing the stop blocks 28 with other blocks of different height. The force of the blow delivered by the upper jaw 86 may be varied by adjustment of the stop rods 102. The dimensions of the blocks severed from the slab may be varied by adjustment of the stop bar 73. The rate of movement of the slab 39 may be varied by adjustment of the length of the chain 104.

Figure 11:
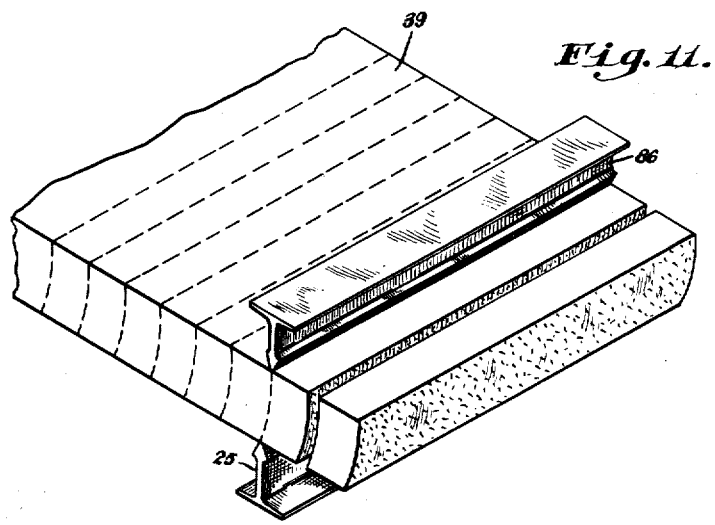
Fig. 11 is a diagrammatic view showing the manner in which one block shape may be produced.
Figure 12:
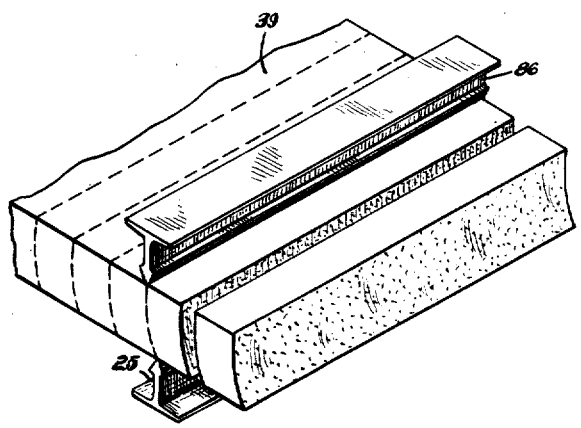
Fig. 12 is a similar view showing the manner in which another shape of block may be produced.

If it is desired to produce curved surfaces at the fractures, that can be done by adjustment of the block 85 through the medium of the bolts 89 and slots 88. As shown in Fig. 11, the jaw 86 may be moved closer to the extremity of the slab than is the jaw 25, in which case the fractures will be bowed forwardly. Adjustment of one-sixteenth of an inch will produce substantially the degree of bowing shown, and a greater degree of bowing can be produced by a somewhat greater offset of said jaw. Similarly, as shown in Fig. 12, an adjustment of the jaw 86 away from the extremity of the slab will produce opposite bowing of the fracture.

It is particularly to be noted that the results which I obtain flow from the delivery, to the slab, of a tremendously heavy, sudden shock, as distinguished from a crushing and wedging pressure. Furthermore, it is my present belief that flat surfaces of substantial width, in the direction of the length of the slab, are essential to the practice of the present invention, as distinguished from sharpened knives.

I claim as my invention:

1. A stone breaking machine comprising a frame, a lower breaker jaw supported on said frame, an upper breaker jaw reciprocably mounted on said frame to move toward and away from said lower jaw, a stone supporting bed having one end adjacent said jaws and its other end remote from said jaws, means for shifting the end of said bed remote from said jaws to move said bed between a horizontal position and a position inclined downwardly toward said jaws, means for lifting said upper jaw, means for causing said jaw to move violently downward to strike a blow against a slab resting on said lower jaw, and stop means associated with said upper jaw and limiting the downward movement of said upper jaw.

2. A stone breaking machine comprising a frame, a lower breaker jaw supported on said frame, an upper breaker jaw reciprocably mounted on said frame to move toward and away from said lower jaw, a stone supporting bed having one end adjacent said jaws and its other end remote from said jaws, means for shifting the end of said bed remote from said jaws to move said bed between a horizontal position and a position inclined downwardly toward said jaws, means for lifting said upper jaw, means for causing said jaw to move violently downward to strike a blow against a slab resting on said lower jaw, and stop means associated with said upper jaw and for arresting the downward movement of said upper jaw at a level very slightly below the upper surface of such slab.

3. A stone breaking machine comprising a frame, a lower breaker jaw supported on said frame, an upper breaker jaw reciprocably mounted on said frame to move toward and away from said lower jaw, a stone supporting bed having one end adjacent said jaws and its other end remote from said jaws, means for shifting the end of said bed remote from said jaws to move said bed between a horizontal position and a position inclined downwardly toward said jaws, fluid means for lifting said upper jaw, and fluid means for causing said jaw to move violently downward to strike a blow against a slab resting on said lower jaw.

4. A stone breaking machine comprising a frame, a lower breaker jaw supported on said frame and having a flat, upwardly-presented face, a stone supporting bed having an end located adjacent said lower jaw and its other end remote from said jaw, means supporting said bed normally with its stone supporting surface substantially in the horizontal plane of said face, stop means located adjacent said lower jaw, said lower jaw being between said bed and said stop means, means for lifting that end of said bed adjacent said jaw into a plane above said face, means for lifting the other end of said bed to a still higher level, and an upper breaker jaw cooperatively reciprocable toward and away from said lower jaw.

5. A stone breaking machine comprising a lower breaker jaw having a flat, upwardly-presented face, a stone supporting bed mounted at one end adjacent said jaw to swing about a vertically movable axis substantially parallel with said jaw, means for moving said axis, means for swinging said bed about said axis, and an upper breaker jaw cooperable with said lower jaw and movable toward and away from the same.

6. A stone breaking machine comprising a frame, a lower breaker jaw mounted on said frame, a stone supporting bed, cushioning means on said frame for supporting, at times, that end of said bed nearer said jaw, cushioning means on said frame for supporting, at times, that end of said bed remote from said jaw, means mounted on said frame and operatively associated with said bed for elevating the first-named end of said bed above the level of said jaw, other means mounted on said frame and operatively associated with said bed for elevating the last-named end of said bed to a greater degree, and an upper jaw mounted in said frame for reciprocation toward and away from said lower jaw.

7. A stone breaking machine comprising a frame, a lower breaker jaw mounted on said frame, a stone supporting bed, cushioning means on said frame for supporting, at times, that end of said bed nearer said jaw, cushioning means on said frame for supporting, at times, that end of said bed remote from said jaw, means mounted on said frame and operatively associated with said bed for elevating the first-named end of said bed above the level of said jaw, other means mounted on said frame and operatively associated with said bed for elevating the last-named end of said bed to a greater degree, separate stop means for said bed ends, separately adjustable to limit the degree of elevation thereof, and an upper jaw mounted in said frame for reciprocation toward and away from said lower jaw.

8. A stone breaking machine comprising a frame, a lower breaker jaw mounted on said frame, a stone supporting bed, cushioning means on said frame for supporting, at times, that end of said bed nearer said jaw, cushioning means on said frame for supporting, at times that end of said bed remote from said jaw, fluid-operated means mounted on said frame and operatively associated with said bed for elevating the first-named end of said bed above the level of said jaw, other fluid-operated means mounted on said frame and operatively associated with said bed for elevating the last-named end of said bed to a greater degree, and an upper jaw mounted in said frame for reciprocation toward and away from said lower jaw.

9. A stone breaking machine comprising a frame, a lower breaker jaw mounted on said frame, a stone supporting bed, cushioning means on said frame for supporting, at times, that end of said bed nearer said jaw, cushioning means on said frame for supporting, at times, that end of said bed remote from said jaw, means mounted on said frame and operatively associated with said bed for elevating the first-named end of said bed above the level of said jaw, other means mounted on said frame and operatively associated with said bed for elevating the last-named end of said bed to a greater degree, a carriage normally mounted on said frame for travel toward and away from said jaw, said jaw being located between said bed and said carriage and an upper jaw mounted in said frame for reciprocation toward and away from said lower jaw.

10. A stone breaking machine comprising a frame, a lower breaker jaw mounted on said frame, a stone supporting bed, cushioning means on said frame for supporting, at times, that end of said bed nearer said jaw, cushioning means on said frame for supporting, at times, that end of said bed remote from said jaw, means mounted on said frame and operatively associated with said bed for elevating the first-named end of said bed above the level of said jaw, other means mounted on said frame and operatively associated with said bed for elevating the last-named end of said bed to a greater degree, a stop bar mounted on said frame, said jaw being located between said bed and said bar means for adjusting said bar toward and away from said jaw in a substantially horizontal plane, means for elevating said bar out of the path of stone moving through the machine, and an upper jaw mounted in said frame for reciprocation toward and away from said lower jaw.

11. A stone breaking machine comprising a frame, a lower breaker jaw mounted on said frame, a stone supporting bed, cushioning means on said frame for supporting, at times, that end of said bed nearer said jaw, cushioning means on said frame for supporting, at times, that end of said bed remote from said jaw, means mounted on said frame and operatively associated with said bed for elevating the first-named end of said bed above the level of said jaw, other means mounted on said frame and operatively associated with said bed for elevating the last-named end of said bed to a greater degree, substantially vertical guide means carried by said frame, slide means mounted for reciprocation on said guide means, a stop bar carried by said slide means and located at all times on that side of said jaw opposite said bed, said slide means being provided with substantially horizontally-extending guide means and said bar being adjustably mounted in said horizontally-extending guide means, means for securing said bar in any desired position relative to said horizontally-extending guide means, and an upper jaw mounted in said frame for reciprocation toward and away from said lower jaw.

12. A stone breaking machine comprising means for supporting a slab of stone including a dull, narrow, flat surface extending from side to side of said slab and engaging the lower surface of said slab on a line near one end of said slab, said slab being unsupported from the region of said flat surface to said one end, and means including a second dull, narrow, flat surface substantially coextensive with said first-named surface for delivering to the upper surface of said slab a heavy blow on a line parallel with said first-named line and located in a plane normal to said slab lower surface and slightly offset from said first-named line.

13. The method of producing stone blocks from slab stone which comprises the steps of supporting the lower surface of a slab upon a suitable rest with an end portion of said slab projecting beyond said rest, providing a dull, narrow, flat surface in supporting engagement with the lower surface of said slab end portion upon a line transverse to the direction of such projection of said slab and spaced from said rest, positioning that end of such rest remote from said surface at a level above said surface, providing an abutment for the projecting end of said slab beyond said surface, then swinging said rest about an axis near said surface to shift said slab into a horizontal position and to retract said end thereof from said abutment, and delivering a heavy blow against the upper surface of said slab upon a line parallel with said first-named line.

14. The method of producing from said slab stone, blocks having broken front and rear surfaces, the front and rear surfaces of each block being curved forwardly about axes extending transversely of the slab and parallel with the top and bottom surfaces thereof, which comprises the steps of supporting the lower surface of a slab upon a suitable rest with an end portion of said slab projecting beyond said rest, providing a dull, narrow, flat surface in supporting engagement with the lower surface of said slab end portion upon a line transverse to the direction of such projection of said slab and spaced from said rest, and delivering a heavy blow against the upper surface of said slab upon a line parallel with said first-named line, and located slightly nearer to the extremity of said end portion than is said first-named line.

15. The method of producing from slab stone, blocks having broken front and rear surfaces, the front and rear surfaces of each block being curved rearwardly about axes extending transversely of the slab and parallel with the top and bottom surfaces thereof, which comprises the steps of supporting the lower surface of a slab upon a suitable rest with an end portion of said slab projecting beyond said rest, providing a dull, narrow, flat surface in supporting engagement with the lower surface of said slab end portion upon a line transverse to the direction of such projection of said slab and spaced from said rest, and delivering a heavy blow against the upper surface of said slab upon a line parallel with said first-named line and located slightly farther from the extremity of said end portion than is said first-named line.

16. A stone breaking machine comprising a frame, a pair of cooperating jaws mounted on said frame, and means for feeding stone between said jaws comprising a stone supporting bed, a first fluid motor comprising a cylinder movably mounted on said bed and a piston reciprocable in said cylinder, means operatively connecting said piston to lift that end of said bed nearer said jaws when said piston moves toward one end of its cylinder, a second fluid motor comprising a second cylinder movably mounted on said bed and a second piston reciprocable in said second cylinder, means operatively connecting said second piston to lift that end of said bed remote from said jaws when said second piston moves toward one end of its cylinder, stop means independently limiting the degree of movement of said bed ends under the influence of their motors, a source of fluid under pressure, conduit means connecting said source with both of said cylinders, and valve means controlling flow of fluid to and from said cylinders.

17. A stone breaking machine comprising a frame, a lower jaw mounted in said frame, a stone supporting bed mounted on said frame near said jaw, an upper jaw mounted in said frame for reciprocation toward and away from said lower jaw for cooperation therewith, a stop bar mounted on said frame on that side of said jaws opposite said bed for reciprocation into and out of the path of stone moving through the machine, a first fluid motor mounted on said frame and operatively connected to reciprocate said upper jaw, a second fluid motor mounted on said frame and operatively connected to reciprocate said stop bar, a third fluid motor mounted on said frame and operatively connected to lift that end of said bed nearer said jaws, a fourth fluid motor mounted on said frame and operatively connected to lift the other end of said bed, a source of fluid under pressure, and valve-controlled conduit means connecting said source with all of said motors.

18. A stone breaking machine comprising a frame, a lower jaw mounted in said frame, a stone supporting bed mounted on said frame near said jaw, an upper jaw mounted in said frame for reciprocation toward and away from said lower jaw for cooperation therewith, a stop bar mounted on said frame on that side of said jaws opposite said bed for reciprocation into and out of the path of stone moving through the machine, a first fluid motor mounted on said frame and operatively connected to reciprocate said upper jaw, a second fluid motor mounted on said frame and operatively connected to reciprocate said stop bar, a third fluid motor mounted on said frame and operatively connected to lift that end of said bed nearer said jaws, a fourth fluid motor mounted on said frame and operatively connected to lift the other end of said bed, a source of fluid under pressure, conduit means connecting said source with each end of said first motor, valve means connected in said conduit means and operable to control selectively fluid flow to and from both ends of said first motor, other conduit means connecting said source with said second motor, other valve means controlling fluid flow to and from said second motor, further conduit means connecting said source with said third and fourth motors, and further valve means controlling fluid flow to and from said third and fourth motors simultaneously.

19. The machine of claim 4 in which said bed-supporting means is vertically resilient.

JOSEPH SOLOMITO.

REFERENCES CITED

The following references are of record in the file of this patent:

UNITED STATES PATENTS

| Number | Name | Date |
| --- | --- | --- |
| 624,581 | Travaglini | May 9, 1899 |
| 625,070 | Travaglini | May 16, 1899 |
| 1,162,685 | Derbyshire | Nov. 30, 1915 |
| 1,919,801 | Newsom | July 25, 1933 |